United States Patent [19]
Brase et al.

[11] Patent Number: 6,012,112
[45] Date of Patent: Jan. 4, 2000

[54] DVD ASSEMBLY, AND ASSOCIATED APPARATUS, FOR A CONVERGENT DEVICE

[75] Inventors: Thomas J. Brase, Eugene, Oreg.; Derrill L. Sturgeon, Spring, Tex.; Donald K. Zickefoose, Canal Fulton, Ohio; Christopher A. Howard, Houston; William H. Ellis, The Woodlands, both of Tex.; Mark P. Vaughn, Angel Fire, N.Mex.; Drew S. Johnson, Houston, Tex.

[73] Assignee: Compaq Computer Corporation, Houston, Tex.

[21] Appl. No.: 08/940,646

[22] Filed: Sep. 30, 1997

[51] Int. Cl.$^7$ ........................................ G06F 13/00
[52] U.S. Cl. ................................ 710/62; 709/218
[58] Field of Search .................... 395/882, 200.48; 348/552, 14; 380/9; 701/62; 709/218

[56] References Cited

U.S. PATENT DOCUMENTS

| | | | |
|---|---|---|---|
| 5,004,185 | 4/1991 | Lockhart, Jr. et al. | 224/3.14 |
| 5,109,414 | 4/1992 | Harvey et al. | 380/9 |
| 5,192,999 | 3/1993 | Graczyk et al. | 358/85 |
| 5,283,638 | 2/1994 | Engberg et al. | 348/14 |
| 5,283,819 | 2/1994 | Glick et al. | 379/90 |
| 5,563,665 | 10/1996 | Chang | 348/552 |
| 5,771,484 | 2/1996 | Tognazzini | 701/117 |
| 5,774,664 | 6/1998 | Hidary et al. | 395/200.48 |
| 5,819,156 | 1/1997 | Belmont | 455/2 |
| 5,825,876 | 2/1996 | Peterson, Jr. | 380/4 |

OTHER PUBLICATIONS

Nilsson, Frank; "DVD–the storage medium for the future?"; Accessed Sep. 8, 1997; pp. 1–9.

DVD Frequently Asked Questions (with answers!); Accessed Jun. 18, 1997; http://www.videodiscovery.com/vdyweb/dvdfaq.html.

Parker, Dana J.; "DVD: The Update"; *CD–ROM Professional*, Aug. 1996; Accessed Sep. 8, 1997; pp. 1–10.

"Digital Video Disc: The Coming Revolution in Consumer Electronics"; *C–Cube Microsystems*; Accessed Jun. 23, 1997; hhtp://www.c–cube.com/technology/dvd.html.

"Toshiba SD3006 DVD Digital Video Disc Player"; Consumer Direct Warehouse; Accessed Jun. 18, 1997; hhtp://www.consumer–direct.com/detail.cfm?VPARTNO=SD30006 &WEIGHT=9.0&Q=230.0.

*Primary Examiner*—Joseph E. Palys
*Assistant Examiner*—Omar A. Omar
*Attorney, Agent, or Firm*—Jenkens & Gilchrist, P.C.

[57] ABSTRACT

A DVD assembly, and an associated method, for a convergent device, such as a television converged into a computer. The DVD assembly is integrated into the convergent device to facilitate ease of user control over operation of the DVD assembly. Common control interfaces which include the "look and feel" of the control interfaces otherwise used by the convergent device simplify operational control over operation of the DVD assembly.

12 Claims, 6 Drawing Sheets

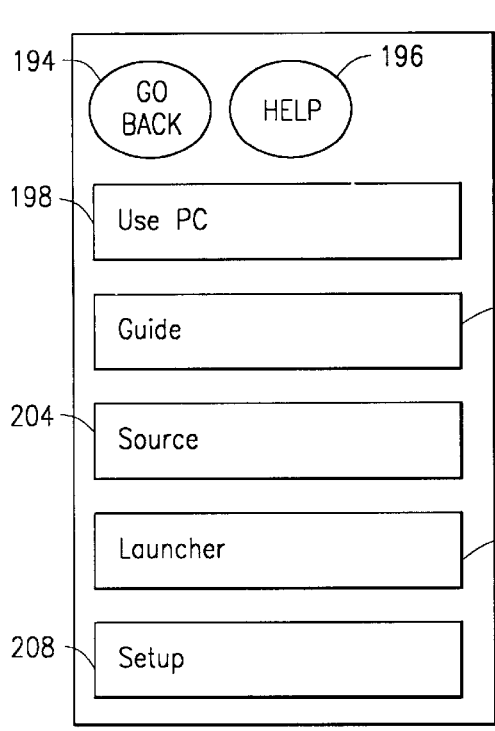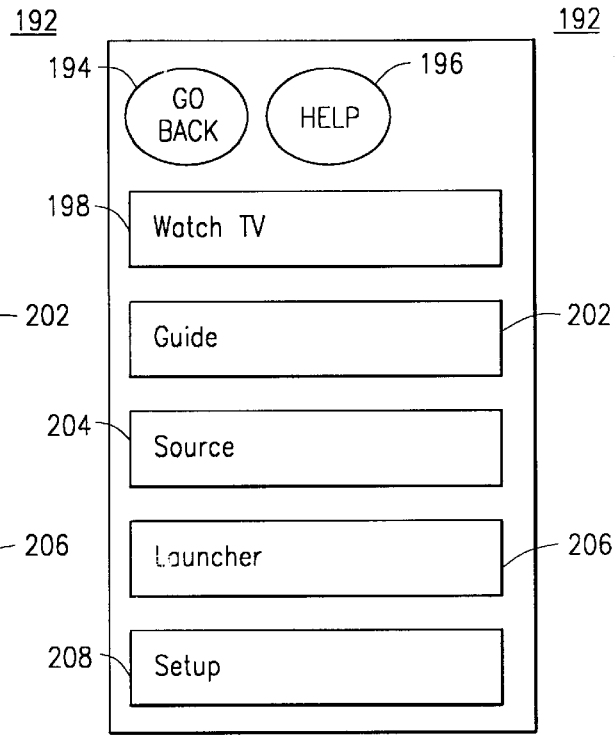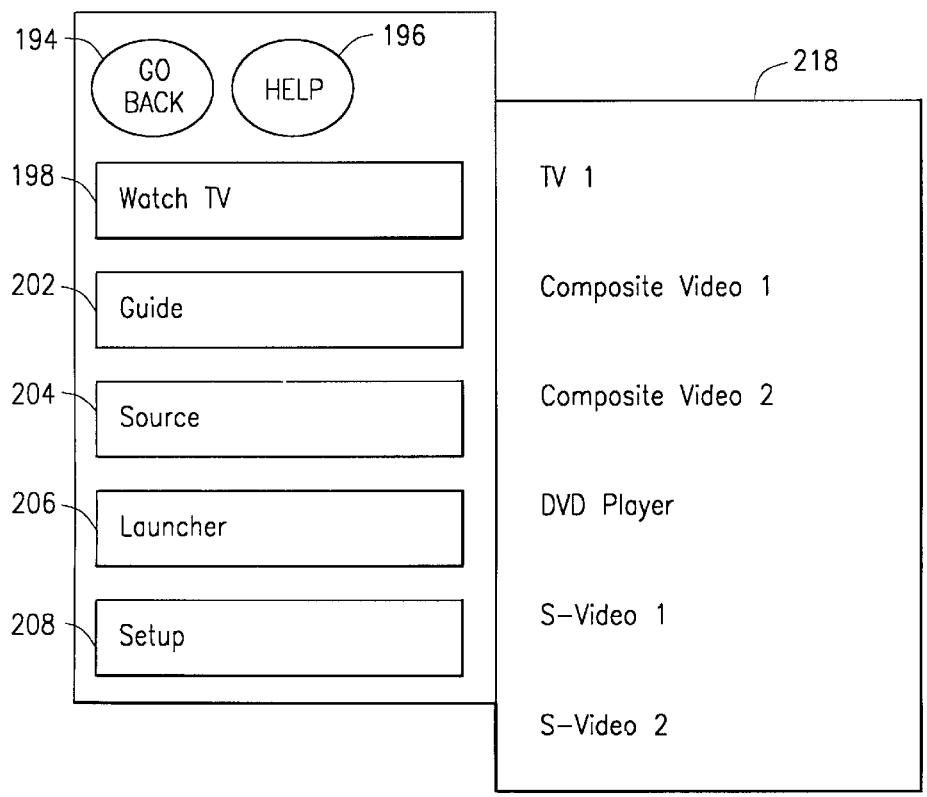

DVD ASSEMBLY, AND ASSOCIATED APPARATUS, FOR A CONVERGENT DEVICE

BACKGROUND OF THE INVENTION

1. Field of the Invention

The present invention relates generally to a convergent device, such as a television converged into a computer, operable in a first operational mode and at least a second operational mode. More particularly, the present invention relates to a DVD (digital versatile/video disc) assembly, and an associated method, integrated into the convergent device.

Operation of an embodiment of the present invention facilitates ease of use of the convergent device and of the DVD assembly integrated therein. A common, or otherwise similar, set of control interfaces is presented to a user of the convergent device. The "look and feel" of the control interfaces is similar in each of the operational modes permitted of the convergent device. DVD presentation is provided to a user in a manner similar to presentation to the user of other functionality of the convergent device. Additionally, in embodiments of the present invention, the DVD presentation is provided to a user by way of a user interface in a similar manner when the convergent device is being operated in each of its permitted operational modes.

User interface displays are presented in manners to facilitate ease of user control of the DVD assembly. An intuitive set of control interfaces is provided to a user. The need for a user to learn separate sets of control interfaces for the convergent device and the DVD assembly, with which the user would otherwise be required to become familiar, is not required. Instead, only a single, integrated set of control interfaces needs to be learned by the user to permit the user to control operation of the DVD assembly as well as other functionality of the convergent device when the convergent device is operated in any of its modes of operation.

2. Description of Related Art

Advancements in many varied technologies have permitted the development of new types of products. Such advancements have similarly permitted improvements to be made to many types of existing products. The advancements precipitating the development of the new products and improvements to existing products are not necessarily in only discrete and disparate technical fields. Convergence of technologies and the advancements therein have facilitated the formation of the new and improved products.

A much sought-after goal has been to develop a device in which various information, entertainment, and communication technologies are converged. Attempts to integrate consumer, computer technologies with consumer, communication technologies are exemplary of this goal. The advancements in, and convergence of, various technologies has facilitated the realization of this goal.

Efforts have been made, for instance, to create a single integrated device, referred to herein as a "convergent device", to be used for information processing, entertainment, and communications. Such a product, for instance, fully utilizes the available communications bandwidth. Further, the product utilizes the mass storage and graphic handling capabilities of a personal computer to deliver, store, and display a variety of applications in a manner to provide a seamlessly-unified, audio-visual environment to a consumer of the product.

Proposals have been set forth to utilize a convergent device, in conjunction with DVD (digital versatile/video disc) apparatus. A resultant, convergent device is provided which offers multiple modes of "functionalities." Such a device essentially appertains to experiences associated with different entities including, inter alia, a personal computer, television, or video/laser disc unit. Commonly-assigned, U.S. Patent Application No. 08/828,992, entitled "Device With Converged Functionality", filed Mar. 31, 1997 now abandoned, discloses, inter alia, such a convergent device, the details of which are incorporated by reference herein.

DVD technology is an advanced, digital-storage technology which permits the storage of video, audio, or data information, or a combination thereof, upon a laser-readable disc of storage media. The storage media disc, referred to as a DVD disc, is capable of storing up to approximately seventeen gigabytes of information. The information is stored at the storage media in accordance with a standardized format. Analogous to some existing, consumer electronics formats, DVD format technology can be visualized as a total system including a mastering facility, a physical storage/distribution medium, i.e., the media disc, and a device for writing information to, and retrieving information stored at, the DVD disc, i.e., the "DVD player".

Mastering typically includes several steps. Namely, mastering steps include: inserting various codes for the controlling of the presentation of the information (the information is sometimes also referred to as "content"); compressing video information into a standard format, e.g., the MPEG-2 (Motion Picture Experts Group-2) format utilizing a variable bit rate and coding process; compressing the audio information into a standard format, e.g., the Dolby™ AC3 surround sound format; and combining the compressed audio and video information into a single, encoded data stream for producing a "master" disc; and generating copies, i.e., laser-readable discs, therefrom.

A DVD player can be added to form a portion of a convergent device. However, functioning of such a DVD player conventionally is not integrated fully into the convergent device. Because of the lack of integration of the DVD player, and its associated driver, into the functionality of the convergent device, separate interface controls are required for operation of the DVD player.

The separate interface controls might well be different for the convergent device and the DVD player. Such an arrangement is inherently user-unfriendly. A user must learn to use the interface controls associated with the convergent device and also the separate interface controls associated with the DVD player. Therefore, intuitive cognizance by a user of the interface controls is limited by the need for the user to become familiar with both of the interface controls.

A manner by which to integrate better the functionality of a DVD player into a convergent device would therefore advantageously facilitate ease of use of the DVD player forming a portion of the convergent device. An intuitive set of control interfaces, for example, could then be provided to a user. Ease of use of the DVD player, as well as other functioning of the convergent device, would be facilitated.

It is in light of this background information related to convergent devices and DVD apparatus that the significant improvements of the present invention have evolved.

SUMMARY OF THE INVENTION

The present invention, accordingly, advantageously provides a DVD assembly, and an associated method, for a convergent device. The DVD assembly is integrated into the convergent device to facilitate ease of use of the DVD assembly as well as to facilitate ease of use of other functions of the convergent device.

By integrating the DVD assembly into the convergent device, the possibility of user confusion during operation of the convergent device is reduced. A common, or otherwise similar, set of interface controls is provided to a user of the convergent device when the convergent device is operated in any of its operational modes. The integration of the DVD assembly into the convergent device permits the specific functionality of the DVD assembly to be accessible through common interface controls of the convergent device.

When the convergent device includes a remote-control input actuator, a control interface for the DVD assembly is integrated into the control interface of the convergent device. Operational control over operation of the DVD assembly is also provided by way of the remote-control, input actuator. When the control interface for the convergent device includes an integrated on-screen display, permitting user selection of control commands by way of the on-screen display, the control interface for the DVD assembly is integrated therein. A DVD presentation, and the control interface associated therewith, is provided to a user in a manner similar to presentation to the user of the other functionality of the convergent device.

In one aspect of the present invention, the convergent device is formed of a tele-video device integrated into a computer. The convergent device so-formed is operable alternately in a tele-video mode of operation and in a computer mode of operation. A DVD assembly including both a DVD player and a DVD driver is integrated into the convergent device to form a portion thereof. The DVD driver is integrated into the application drivers which drive operation of other functioning of the convergent device. The control interface presented to a user, and through which a user of the convergent device controls operation of the convergent device, is also presented to control operation of the DVD assembly integrated therein. The integration of the DVD assembly and the control interfaces presented to a user of the convergent device facilitates easy user control of the operation of the DVD assembly into which the assembly is integrated.

In another aspect of the present invention, a present state of operation exhibited by the DVD player is determinative of the presentation of the control interface to a user of the convergent device. That is to say, for each present state of operation of the DVD assembly, there is a next state which is normally selected by a user. A control interface presents the command associated with driving the DVD assembly into the anticipated next state to the user, such as on a video display monitor. The need for a user to select a single control command amongst a long menu of possible control commands is obviated. Instead, only a single control command, or a selected set of control commands, is presented to the user, thereby to provide a user-friendly interface with the user.

In another aspect of the present invention, a consistent set of control interfaces is provided to a user of the convergent device when operating the convergent device in any of its operational modes. Similarly-appearing control interfaces are presented to a user irrespective of the operational mode in which the convergent device is being operated. User familiarity with control interface selections precipitating desired operation of the DVD assembly is thereby facilitated.

In these and other aspects, therefore, a DVD assembly, and an associated method, is provided for a convergent device. The convergent device is operable alternately in a first operational mode and a second operational mode. The convergent device includes application drivers executable during operation of the convergent device and a display monitor for displaying displays generated during operation of the convergent device. A DVD player is coupled to the convergent device to form a portion thereof. The DVD player is operable when the convergent device is in the first operational mode and in the second operational mode. A DVD driver is integrated into the application drivers of the convergent device. The DVD driver drives operation of the DVD player when operated in the first operational mode and in the second operational mode.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIGS. 3A and 3B illustrate a main selection menu displayable as a control interface during operation of the convergent device shown in FIG. 2.

FIG. 4 illustrates a DVD source menu displayable as a control interface during operation of the convergent device shown in FIG. 2.

DETAILED DESCRIPTION

Figure 1:
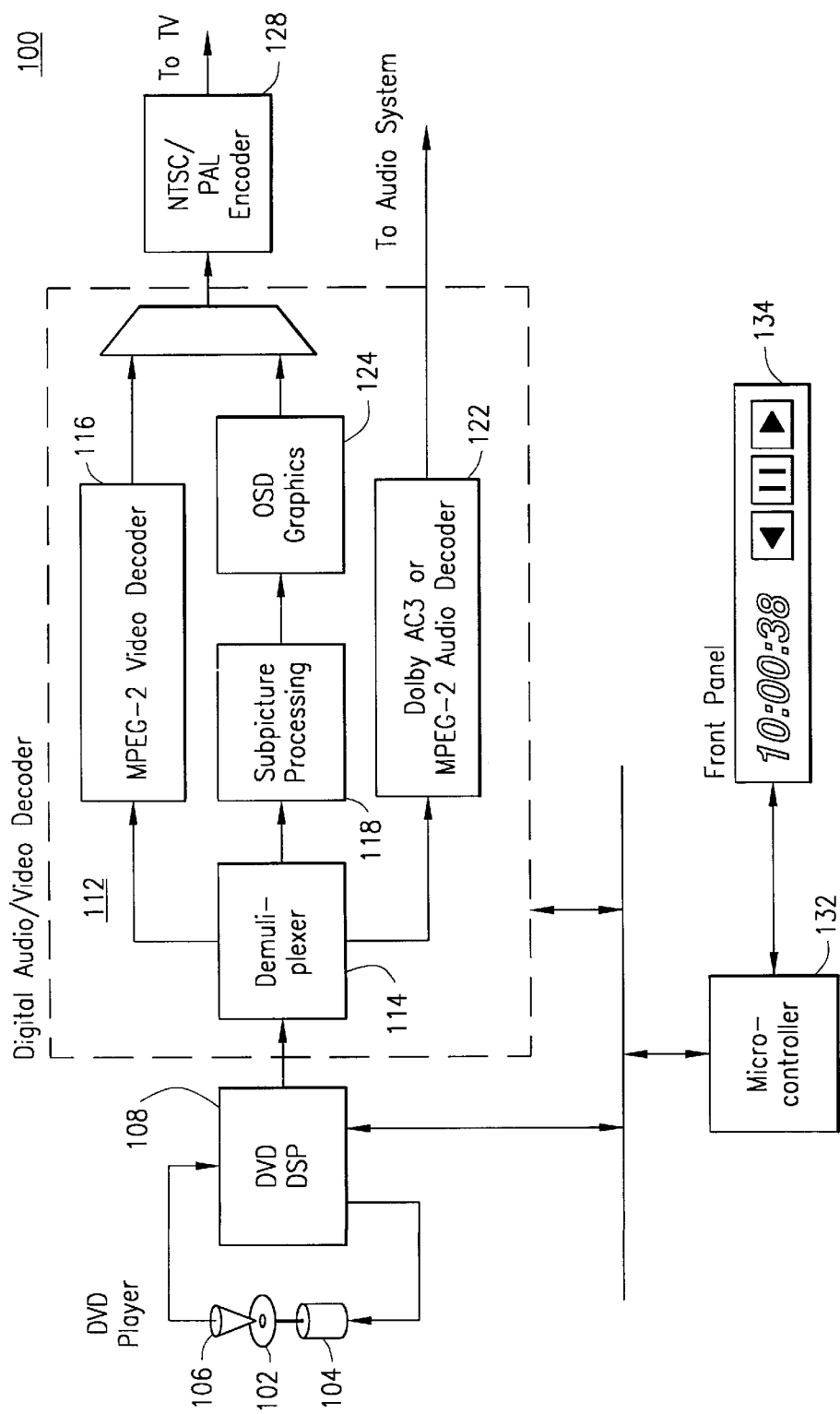
FIG. 1 illustrates a functional block diagram of a DVD player, exemplary of a DVD player integrated into a convergent device according to an embodiment of the present invention.

Referring first to FIG. 1, a DVD player, shown generally at 100, is operable at least to access and to receive information stored upon a DVD disc 102. The information stored upon the DVD disc 102 is formed of video, audio, or data information, or a combination thereof.

A spindle motor 104 is operable to impart rotational forces to the DVD disc 102 to cause rotation of the disc. A laser device 106 is positioned proximate to storage-media containing surfaces of the DVD disc to read digital information therefrom as the DVD disc 102 is rotated.

The information read by the laser device 106 is provided to a DVD-compliant DSP (digital signal processor) 108. The DSP 108 is operable to generate electrical signals representative of the information read from the DVD disc 102 by the laser device 106.

The DVD-compliant DSP 108 is coupled to a digital audio/video (AV) decoder 112. The decoder 112 is operable to process the electrical signals provided thereto by the DSP 108. The decoder 112 includes a demultiplexer 114 which is operable to generate a video content stream. The video content stream is applied to a MPEG-2 video decoder 116. The demultiplexer 114 also provides compressed bit maps to a sub-picture processor 118 and provides an audio content stream to an audio decoder 122, here a Dolby AC3 or MPEG-2 decoder. The sub-picture processor 118 further generates processed, sub-picture information which is applied to an OSD (on-screen display) graphics tool 124.

A video multiplexer 126 is coupled to the decoder 116 and the graphics tool 124. The multiplexer 126 controllably presents decoded video information generated by the video decoder 116 and output signals generated by the graphics tool 124 to an appropriate TV signal encoder, here an NTSC/PAL encoder 128. The encoder 128, in turn, provides a suitable TV signal for application to a television (not shown in the Figure) for playback. And, decoded audio information generated by the audio decoder 122 is provided to an appropriate audio system (not shown in the Figure), such as an audio system integrated with the TV.

A micro controller 132 also forms a portion of the DVD player, here shown to be coupled both to the DVD-compliant DSP 108 and to the decoder 112. The micro controller 132 is operable to supervise and control operation of the DSP 108 and the decoder 112. In the exemplary illustration, the micro controller 132 can be engaged by a user by way of a remote control actuator (not shown in the Figure) or by way of actuation of actuation keys forming a portion of a front housing panel 134 of the DVD player. User actuation of the actuation keys of the remote control actuator or of the keypad of the front panel 134 are translated into commands which control operation of the decoder 112 and/or operation of drive elements of the DVD player.

Figure 2:
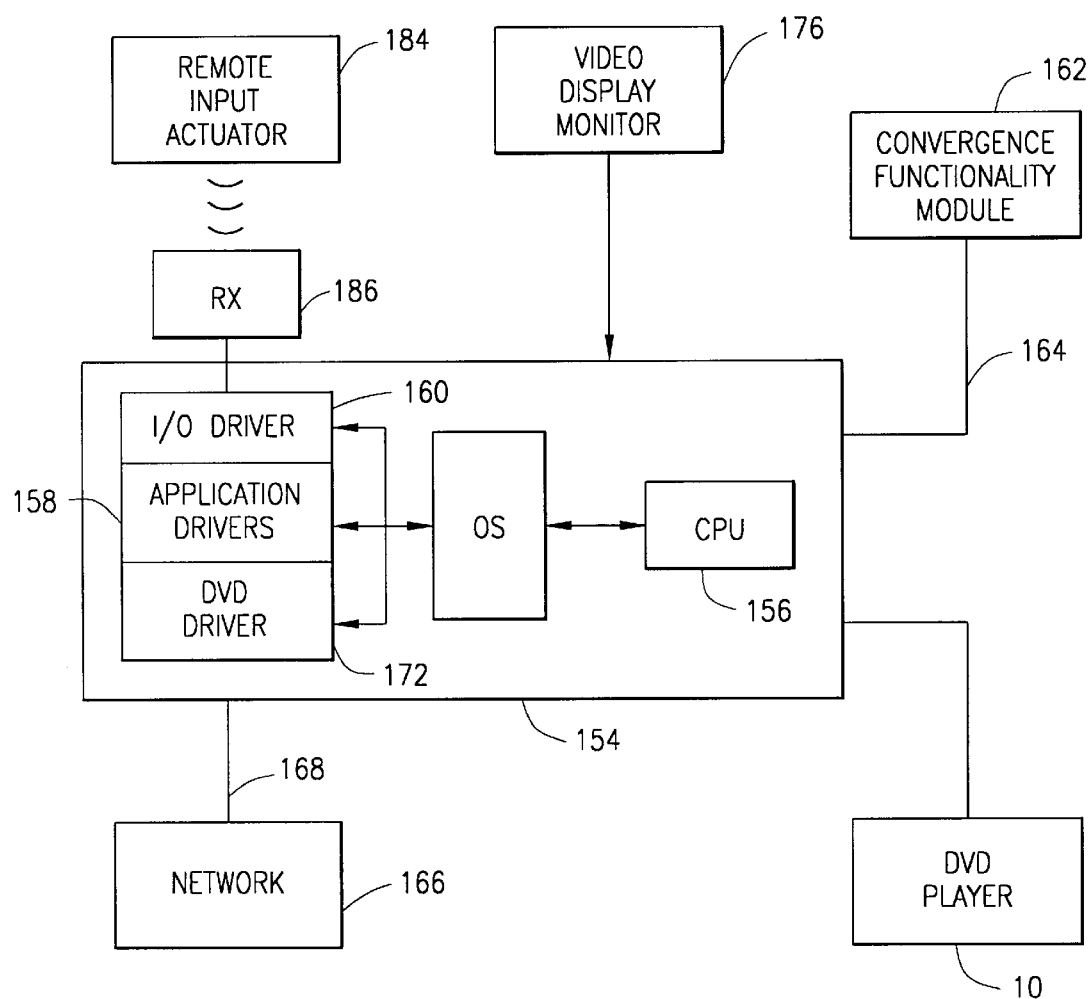
FIG. 2 illustrates a functional block diagram of a convergent device to which a DVD assembly is integrated therein according to an embodiment of the present invention.

FIG. 2 illustrates a convergent device, shown generally at 150, in which an embodiment of the present invention is operable. In an exemplary embodiment, the convergent device 150 is formed of a television convergent into a computer device. It should be understood that the convergent device 150 can similarly represent other types of convergent devices and that operation of an embodiment of the present invention is analogously operable in such other convergent devices.

The convergent device 150 here includes a personal computer 154 operable to perform computer functions through operation of processor-based circuitry, here represented by a CPU (central processing unit) 156. Applications including convergent device drivers 158 and an I/O driver 162 are acted upon by the CPU 156, here by way of an operating system layer 162.

The convergent device 150 further includes a convergence functionality module 162, here to provide tele-video functions. The module 162 is here shown to be functionally connected to the personal computer by way of the line 164. In one implementation, for instance, the convergence functionality module forms a television circuit card which is plugged into a computer backplane of the personal computer 154. The personal computer 154 is here shown further to be coupled to a network 166, here by way of the line 168. The network 166 is exemplary, inter alia, of an Internet and of a television source.

The convergent device 150 is operable in both a computer mode and in a television mode. When in the computer mode, computer functions are provided by the convergent device, and, when in the television mode, tele-video, such as television, functions are provided by the convergent device.

The DVD player 10, shown previously in FIG. 1, also forms a portion of the convergent device 150. The DVD player 10 is here shown to be connected to the personal computer 154. A DVD driver 172 which, similar to the drivers 158 and 162, is acted upon by the CPU 156 to drive operation of the DVD player 10.

A video display monitor 176 also forms a portion of the convergent device 150. The video display monitor 176 is here shown to be connected to the personal computer 154 by way of the lines 178. The video display monitor may, for example, be formed of a CRT (cathode ray tube) or a flat panel display. The video display monitor is operable to display video information during operation of the convergent device in both of its operating modes. When the DVD player 10 is the active source for the video information, video information retrieved from the DVD disc inserted within the DVD player 10 is displayed upon the video display monitor. Such display of the video information is provided during operation of the convergent device in either the computer mode or the tele-video mode.

The video display monitor 176 is operable further to present to a user of the convergent device with control interface displays facilitating user control over operation of the convergent device. An embodiment of the present invention integrates control interfaces for the control of the DVD player 10 into the control interfaces presented for other functioning of the convergent device 150. That is to say, control interfaces through which a user controls operation of the DVD player are not separate from the control interfaces otherwise used by the convergent device to facilitate user control over other functioning of the convergent device. A user of the convergent device need only become familiar with a single set of control interfaces to control operation of both DVD player functioning as well as functioning of other portions of the convergent device.

The convergent device further includes an infrared assembly including a remote actuator 184 and an infrared receiver 186. The actuator 184 is operable, responsive to user actuation of actuation keys of the actuator, to generate infrared signals which are received by the infrared receiver 186. The infrared receiver 186 is coupled to the personal computer 154. By appropriate actuation of the actuation keys of the remote actuator 184, a user is able to generate input commands, such as commands responsive to the control interfaces displayed upon the video display monitor 176, to control operation of the convergent device and the DVD player 10 forming a portion thereof.

FIGS. 3A and 3B illustrate main selection menus 192 of a control interface displayable upon the video display monitor 176 of the convergent device 150. The menu 192 shown in FIG. 3A is displayable during operation of the convergent device in the computer mode. The menu 192 shown in FIG. 3B is displayable upon the video display monitor 176 when the convergent device is operated in the television mode. Such menus 192 are selectively displayable upon the video display monitor to provide a control interface selection menu from which a user of the convergent device can select initiation of additional operation of the convergent device. As comparison of the menus 192 shown in the separate Figures indicates, the menus 192 have similar appearances even though the menus 192 are displayable in separate modes of operation of the convergent device.

In the exemplary embodiment, the menus 192 provide menu buttons which permit, inter alia, switching between the operational modes of the convergent device 150, adjust audio and display settings, start computer applications, establish security measures, and select and set sleep and wake-up timers. The main display menus 192 are displayable upon the video display monitor 176 responsive to actuation, for instance, of an actuation key of the remote input actuator 184.

The main selection menus 192, and all multi-level menus selected therefrom, can be selected by way of the remote input actuator 184 or other appropriate user input actuator, such as a computer keyboard.

The main selection menu 192 includes a plurality of menu buttons, here a go-back button 194, a help button 196, a watch TV/use PC button 198, a guide button 202, a source button 204, a launcher button 206, and a setup button 208. In one embodiment, the buttons 194–208 are accessible by way of a cursor pointing system to position a cursor at a selected menu button by way of the remote input actuator. Once positioned thereat, an actuation key is actuated to select the button and to drive the convergent device responsive to the button selection.

Actuation of the go-back button 194 takes a user back to a previous screen or menu. Each menu level of the menu, including the main selection menus 192, includes a go-back button 194, selectable at any time by a user. When a menu 192 is displayed upon the video display monitor 176 and the go-back button 194 is selected, the menu 192 is removed from display upon the video display monitor 176, and return is made to regular operation of the mode in which the convergent device is operable.

Selection of the help button 196 causes display on the video display monitor 176 of a user's guide which provides information helpful to a user to operate the convergent device 150.

The watch TV button 198 of FIG. 3A and the use PC button 198 of FIG. 3B form menu choices which permit switching between a television mode, permitting a user to watch a full-screen TV display upon the monitor 176, and a PC mode which allows the user to operate the device 150 in the computer mode. When in the computer mode, for example, the user is able to work in a Windows™ environment, play computer video games, and watch a television display in a PIP-like (picture-in-picture) display.

The guide button 202 also forms a menu choice which permits a user to call up an electronic program guide, such as to provide a display of program schedules for shows broadcast within a broadcast area.

The source button 204 provides a menu choice permitting a user to switch to a selected input source for the device desired to be watched, such as the DVD player 10.

The launcher button 206 forms a menu choice permitting a user to launch computer programs from the menu without having first to enter a Windows™ environment. By selection of this menu choice, the convergent device 150 is automatically switched to the computer mode.

The setup button 208 forms a menu choice permitting a user to adjust the system settings based upon personal preferences of the user. In one implementation, one set of default values is created and stored for the computer mode of operation and at least one set of default values is created and stored for the television mode of operation.

Each of the buttons, such as the buttons 194–208 forming portions of the menu 192 and submenus selectable therefrom, and of button-type categories depending upon the manner in which the particular button is operable. As the buttons are formed of only a set number of button-type categories, a user is able to quickly learn of the operational type of the button and to intuitively understand the operation of the button.

FIG. 4 illustrates the display appearing upon the video display monitor 176 when the source button 204 is selected by a user. A source menu 218 appears upon the video display monitor 176. The source menu permits the user to tune to a selected input source for the device from which viewing is desired. Source options include a first television source, the DVD player 10, two composite video sources, and two S-video sources.

A user selects the DVD player as an active source by positioning a cursor at the DVD player button on the source menu 218 and actuating selection of the DVD player therefrom.

Figure 5:
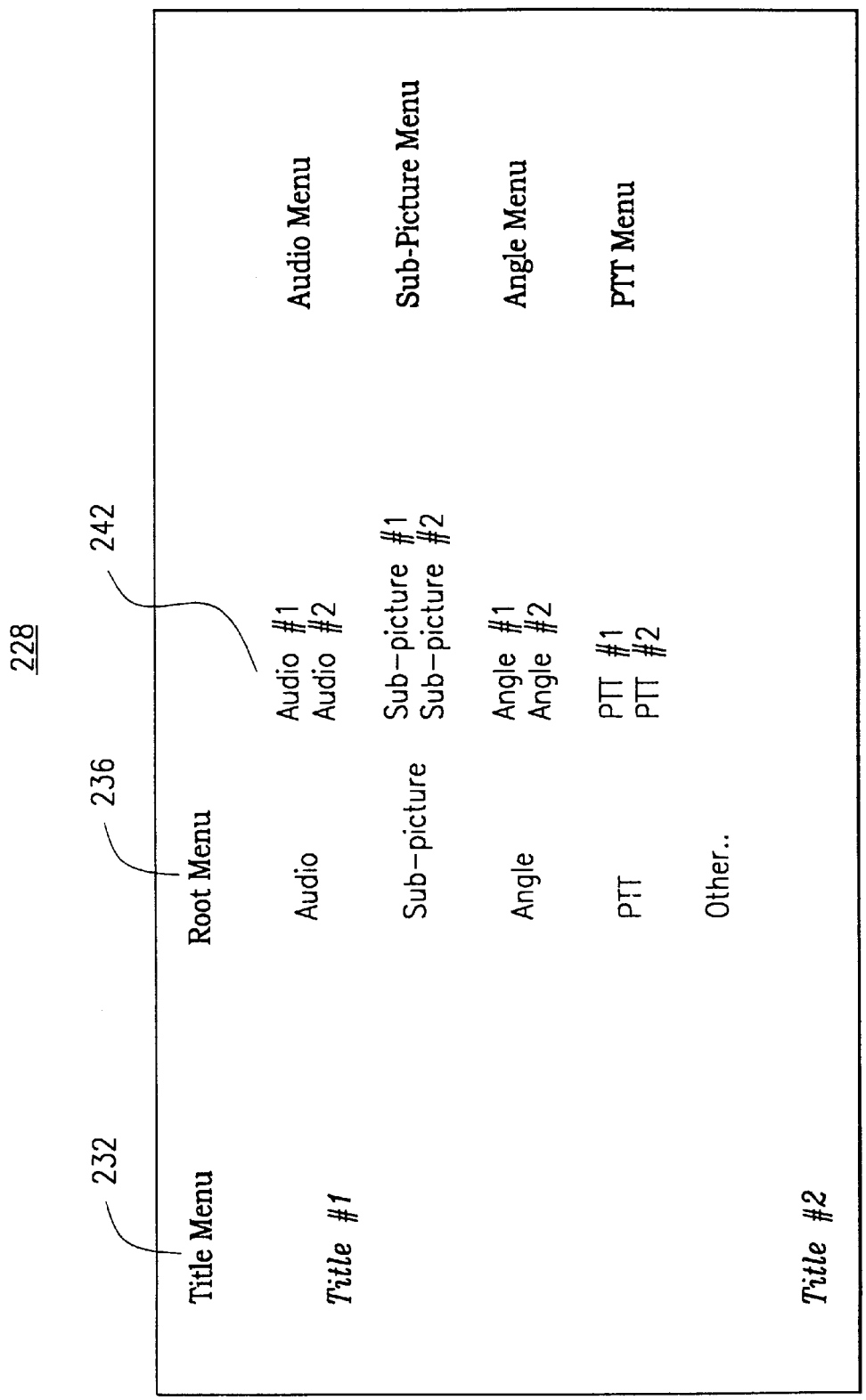
FIG. 5 illustrates a DVD title menu displayable as a control interface during operation of the convergent device shown in FIG. 2.

FIG. 5 illustrates a DVD menu 228 which forms a control interface displayable upon the video display monitor 176 upon user selection of the DVD player as an active source. The DVD menu 228 includes a title menu 232 which lists the titles of information stored on the DVD disc. For each title listed in the title menu 232, there is a root menu 236 which permits a user to make specialized selections or to select, as illustrated, audio, sub-picture, angle, or PTT submenus associated with the particular title. The root selections also may include subroot menus 242 permitting further selection to be made.

Because of the integration of the operation of the DVD player 10 and the DVD driver 172 into other functioning of the convergent device 150, control interfaces having a common "look and feel" facilitate ease of use by a user of the convergent device in the control of operation of the DVD player 10.

In one embodiment of the present invention, display of operational controls for controlling operation of the DVD player 10 when the DVD player forms the active source is dependent upon the present state of the DVD player. That is to say, when the DVD player is in a particular state, such as a "stop" state, the next state that a user typically selects the DVD player to be driven is anticipated and displayed for the user's selection. When, for instance, the present state of the active-source, DVD player is the "stop" state, the user typically selects the DVD player to be driven into the "play" state. Rather than displaying all of the possible states in which the active-source DVD player might be driven, only the anticipated next-state of the DVD player is displayed as the control interface on the video display monitor 176. Such simplification of the control interface facilitates ease of use of the DVD player forming a portion of the convergent device.

Figure 6:
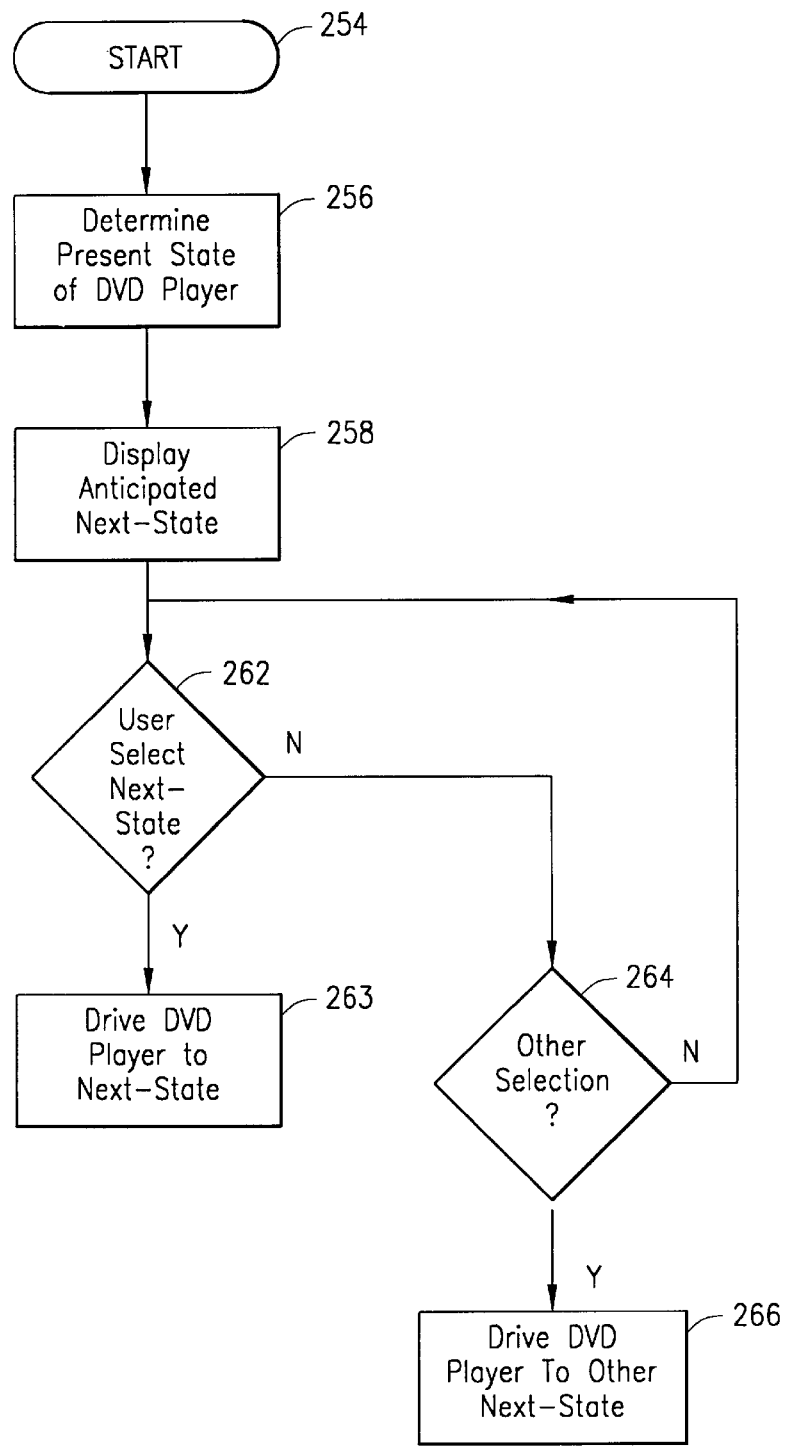
FIG. 6 illustrates a method flow diagram illustrating the method of operation of an embodiment of the present invention.

FIG. 6 illustrates a method, shown generally at 252, of a method by which the control interface displayed upon the video display monitor 176 is simplified when the DVD player 10 forms the active source for the convergent device 150. After entry into the method, indicated by the block 254, a determination is made at the block 256 as to the present state of the DVD player. Each present state of the DVD player has associated therewith an anticipated next-state. Once the present state of the DVD player is determined, the anticipated next-state is displayed, as indicated by the block 258.

Thereafter a determination is made at the decision block 262 as to whether the user selects the anticipated next-state displayed at the control interface on the video display monitor 176. If so, the yes branch is taken to the block 264, and the DVD player 172 is driven by the DVD driver 172 to the next-state of operation. If, conversely, the anticipated next-state is not selected by the user of the convergent device, the no branch is taken from the decision block 262 to the decision block 264. At the decision block 264, a determination is made whether the user has requested an other-than-anticipated next-state of operation of the DVD player. If not, the no branch is taken back to the decision block 262. But, if the user has requested the DVD player to be driven into a state other than the anticipated next-state, the yes branch is taken to the block 262.

Figure 7:
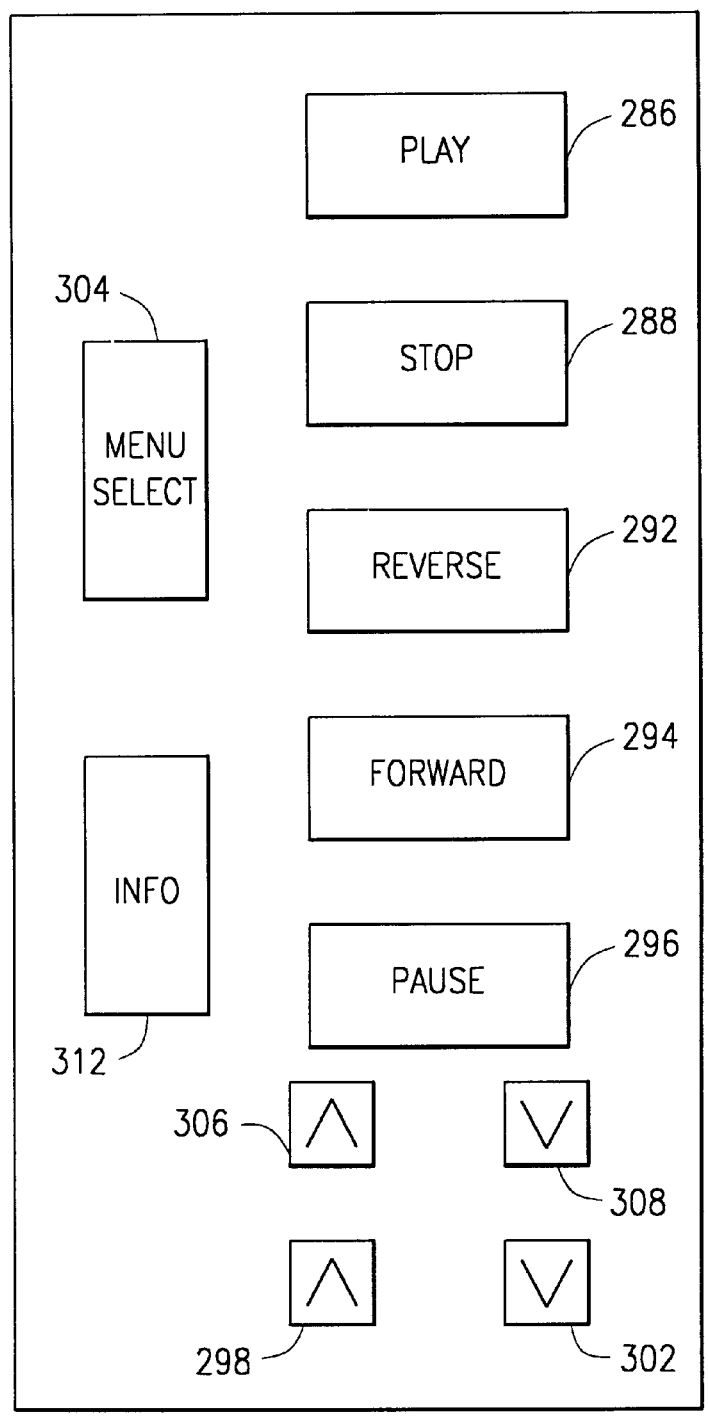
FIG. 7 illustrates the activation keypad of the remote input actuator forming a portion of the convergent device shown in FIG. 2.

FIG. 7 illustrates the keypad of the remote input actuator 184, shown previously in FIG. 2 to form a portion of the convergent device 150. User actuation of actuation keys of the remote input actuator permits the user to control operation of DVD player 10 functioning when the DVD player is the active source. As noted above, the remote input actuator can also be used to select the DVD player 10 to be the active source from which to retrieve information.

In the exemplary embodiment, separate actuation keys disposed upon the remote input actuator permit the DVD player to be driven into any of its allowable states. The actuator includes a play button 286, actuation of which starts playing, or resumes playing from a paused state, the DVD player. A stop button 288 stops playing of the DVD player. A remote button 292 reverses, at variable speeds, the DVD player. For instance, the reverse speed is dependent upon whether the reverse button is actuated when the DVD player is in a stopped state or a playing state and/or if the user actuates the button once or holds the button in an actuated position. A forward button 294 analogously permits forward operations at variable speeds. A pause button 296, when actuated, pauses playback of the DVD player. Channel up and down buttons 298 and 302 perform chapter (PTT) forward and backward functions to be performed upon the DVD player 10.

The remote input actuator 184 further includes a menu-select key 304, actuation of which initiates the display of the DVD menu 228 by the DVD application and driver 172. In one implementation, the menu-select key is a left-mouse button. Actuation of the menu-select key 304 drives the display of the DVD menu 228 upon the video display monitor in the alternative to the sequence of control interface selections described above with respect to FIGS. 3–5.

The remote input actuator 184 further includes volume up and volume down keys 306 and 308, respectively. The channel up and down keys 298 and 302 and volume up and down keys 206 and 208 are utilized to position a cursor when the DVD menu 228 is displayed (as well as when other menus are displayed). Actuation of the up and down buttons 298 and 302 move the highlight up and down, respectively of the cursor on the DVD menu. And, actuation of the up and down keys of the actuator 184 position the cursor in a rightward and leftward direction, respectively. The menu select button is actuated to select the current highlighted item on the control interface displayed upon the video display monitor 176.

An information key 312, when actuated, causes the current status of the DVD player 10 to be displayed upon the on-screen display of the video display monitor 176.

Operation of an embodiment of the present invention integrates the functionality of the DVD player 10 into the functioning of the convergent device 150. Control interfaces presented to a user of the convergent device 150 for controlling operation of the DVD player 10 are integrated into the control interfaces provided to the user for other functionality of the convergent device. Thereby, the user of the convergent device is provided with a user-friendly control interface to facilitate operable control over the operation of the convergent device. The control interfaces presented to the user are similar irrespective of the mode in which the convergent device is being operated, further facilitating the user-friendliness of the control interfaces.

The previous descriptions are of preferred examples for implementing the invention, and the scope of the invention should not necessarily be limited by this description. The scope of the present invention is defined by the following claims.

What is claimed is:

1. A convergent device operable alternately in a first operational mode and a second operational mode, the convergent device including application drivers executable during operation of the convergent device, and a display monitor for displaying displays generated during operation of the convergent device, a combination with the convergent device of a DVD (digital versatile/video disc) assembly, said DVD assembly including:

a DVD player coupled to the convergent device and forming a portion thereof, said DVD player operable when the convergent device is in the first operational mode and in the second operation mode;

a DVD driver integrated into the application drivers of the convergent device, said DVD driver for driving operation of the DVD player when operated in the first operational mode and in the second operation mode;

a user interface including a remote input actuator for generating selected actuation signals responsive to user actuation thereof;

an actuation signal receiver for receiving the actuation signals; and a convergent device input/output software driver, said DVD driver integrated with the convergent-device input/output software driver;

wherein said DVD player is operable to receive a DVD disc, the DVD disc including information stored therein, the information stored on the DVD disc divided into subsets of information, each subset identified by a subset identifier, and wherein the selected actuation signals capable of generation by the remote input actuator comprises a subset-identifier signal, generation of the subset-identifier signal for causing said DVD driver to drive generation on the display monitor of a subset-identifier menu, the subset identifier menu containing the subset identifiers identifying the subsets of information into which the information stored upon the DVD disc is divided.

2. The apparatus of claim 1 wherein the selected actuation signals capable of generation by the remote input actuator comprises a menu-select signal, generation of the menu-select signal for causing said DVD driver to drive generation on the display monitor of a DVD menu, the DVD menu containing at least one item of permitted operation of said DVD player.

3. The apparatus of claim 2 wherein the selected actuation signals capable of generation by the remote input actuator further comprises at least one item select signal, the at least one item select signal for selecting the at least one item of permitted operation of said DVD player, said DVD driver for driving operation of said DVD player responsive to the item select signal.

4. The apparatus of claim 2 wherein said DVD player exhibits a present state of operation, the present state of operation having an expected next-state of operation associated therewith, and wherein the item of permitted operation of said DVD player contained on the DVD menu caused to be displayed upon the display monitor by said DVD driver comprises an item, when selected, which causes said DVD driver to drive operation of said DVD player into the expected next-state.

5. The apparatus of claim 4 wherein the convergent device comprises a television converged into a computer, wherein the first operational mode comprises a tele-video mode of operation and the second operational mode comprises a computer mode of operation and wherein the DVD menu is displayable during operation of the television converged into the computer in both the tele-video mode of operation and the computer mode of operation.

6. The apparatus of claim 5 wherein the selected actuation signals generated by the remote input actuator are selectively utilized by said DVD driver to drive operation of said DVD player, the selected actuation signals used by said DVD driver during operation of said DVD player.

7. The apparatus of claim 6 wherein the selected actuation signals are used by application drivers other than said DVD driver when said DVD player is not being operated.

8. In a method for operating a convergent device having application drivers executable during operation of the convergent device and a display monitor for displaying displays generated during operation of the convergent device, the convergent device operable alternately in a first operational mode and a second operational mode, an improvement of a method for providing DVD functionality to the convergent device, said method comprising the steps of:

coupling a DVD player to the convergent device to form a portion thereof, the DVD player operable when the convergent device is in the first operational mode and the second operational mode;

integrating a DVD driver into an input/output driver of the application drivers; and generating selected actuation signals responsive to user actuation of the remote input actuator and driving the DVD player responsive to the selected actuation signals;

wherein the DVD player coupled during the step of coupling is operable to receive a DVD disc, the DVD disc including information stored thereon, the information divided into subsets of information, each subset identified by a subset identifier, wherein the actuation signals generated during said step of generating comprises a subset-identifier signal, and wherein said step of driving comprises driving generation on the display monitor of a subset-identifier menu, the subset identifier menu containing the subset identifiers identifying the subsets of information.

9. The method of claim 8 wherein the selected actuation signals generated during said step of generating comprising a menu-select signal, and wherein said step of driving comprises driving generation of a DVD menu on the display monitor, the DVD menu containing at least one item of permitted operation of the DVD player.

10. The method of claim 9 wherein the selected actuation signals generated during said step of generating further comprises at least one item select signal, and wherein said step of driving comprises driving operation of the DVD player responsive to the item select signal.

11. The method of claim 9 wherein the DVD player coupled during said step of coupling exhibits a present state of operation, the present state of operation having an expected next-state of operation associated therewith, and wherein the item of permitted operation of the DVD player displayed on the display monitor during said step of driving comprises an item, when selected, drives operation of the DVD player into the expected next-state.

12. The method of claim 9 wherein the convergent device comprises a television converged into a computer, wherein the first operational mode comprises tele-video mode of operation and the second operational mode comprises a computer mode of operation and wherein the DVD menu displayed responsive to said step of driving is displayable during operation of the television converged into the computer on both the tele-video mode of operation and the computer mode of operation.

* * * * *